(12) United States Patent
Landry

(10) Patent No.: US 11,147,210 B2
(45) Date of Patent: Oct. 19, 2021

(54) STRING TRIMMER ATTACHMENT ASSEMBLY

(71) Applicant: Gerard Landry, River Ridge, LA (US)

(72) Inventor: Gerard Landry, River Ridge, LA (US)

( * ) Notice: Subject to any disclaimer, the term of this patent is extended or adjusted under 35 U.S.C. 154(b) by 31 days.

(21) Appl. No.: 16/183,892

(22) Filed: Nov. 8, 2018

(65) Prior Publication Data

US 2020/0146216 A1  May 14, 2020

(51) Int. Cl.
*A01D 34/84* (2006.01)
*A01D 34/416* (2006.01)

(52) U.S. Cl.
CPC ........... *A01D 34/84* (2013.01); *A01D 34/416* (2013.01)

(58) Field of Classification Search
CPC ...... A01D 34/416; A01D 34/84; A01D 43/16; A01D 34/4165; A01D 34/46; A01G 3/06; A01G 3/062; A01G 9/28; A01G 9/00; A01G 3/00
See application file for complete search history.

(56) References Cited

U.S. PATENT DOCUMENTS

| | | | | |
|---|---|---|---|---|
| 2,791,082 A * | 5/1957 | McDonough | ........... | A01G 3/062 56/13.4 |
| 3,238,710 A * | 3/1966 | McCullough | ........... | A01D 34/84 56/246 |
| 3,587,749 A * | 6/1971 | Sauer | .................... | A01G 3/062 172/15 |
| 4,224,784 A * | 9/1980 | Hansen | .................. | A01G 3/062 56/12.7 |
| 4,442,659 A * | 4/1984 | Enbusk | .................. | A01G 3/062 280/47.24 |
| 4,531,350 A * | 7/1985 | Huthmacher | ........ | A01D 34/416 172/17 |
| 4,756,148 A | 7/1988 | Gander | | |
| 4,796,415 A * | 1/1989 | Moore | ................. | A01D 34/416 56/16.7 |
| 4,803,831 A * | 2/1989 | Carmine | .............. | A01D 34/416 56/16.9 |
| 4,829,755 A * | 5/1989 | Nance | .................. | A01D 34/416 56/17.1 |
| 4,894,916 A * | 1/1990 | Nimz | ..................... | A01G 3/062 30/290 |
| 4,914,899 A | 4/1990 | Carmine | | |
| 4,981,012 A | 1/1991 | Claborn | | |
| 5,029,435 A * | 7/1991 | Buchanan | ............. | A01D 34/90 56/12.1 |

(Continued)

FOREIGN PATENT DOCUMENTS

GB 729942 A * 5/1955 ............. A01G 3/062

*Primary Examiner* — Thomas B Will
*Assistant Examiner* — Madeline Ivy Runco

(57) ABSTRACT

A string trimmer attachment assembly for edging a lawn includes a weed trimmer that has a pole, a gear head that is coupled to the pole and a trimming head that is rotatably coupled to the gear head. The gear head is angled between the pole and the trimming head. A rolling unit is removably coupled to the pole of the weed trimmer. The rolling unit is oriented to extend along a perpendicular axis with respect to a rotational axis of the trimming head. Additionally, the rolling unit horizontally orients the rotational axis of the trimming head when the rolling unit is positioned to roll along a support surface. In this way the trimming head is positioned to perform edging along a vertical edge.

5 Claims, 4 Drawing Sheets

(56) References Cited

U.S. PATENT DOCUMENTS

| | | | | |
|---|---|---|---|---|
| 5,092,112 A * | 3/1992 | Buckendorf, Jr. | ............................ | A01D 34/4167 56/12.7 |
| 5,095,687 A * | 3/1992 | Andrew | ............... | A01D 34/416 172/17 |
| 5,107,665 A * | 4/1992 | Wright | ................... | A01G 3/062 30/275.4 |
| 5,226,486 A * | 7/1993 | Naiser | ................... | A01G 3/062 172/15 |
| 5,228,276 A * | 7/1993 | Miller | .................... | A01D 34/84 30/275.4 |
| 5,263,303 A * | 11/1993 | Stroud | ................ | A01D 34/416 56/12.7 |
| 5,351,762 A * | 10/1994 | Bean | .................... | A01D 34/416 172/17 |
| 5,385,005 A | 1/1995 | Ash | | |
| 5,477,665 A * | 12/1995 | Stout | .................... | A01D 34/001 56/16.7 |
| 5,524,349 A * | 6/1996 | Dolin | ................. | A01D 34/4167 30/276 |
| 6,351,930 B1 * | 3/2002 | Byrne | ................... | A01D 34/84 172/17 |
| 6,363,699 B1 * | 4/2002 | Wang | ................... | A01D 34/001 56/12.7 |
| 6,370,854 B1 * | 4/2002 | Moore | ................ | A01D 34/001 56/16.7 |
| 6,381,854 B1 * | 5/2002 | Pagliero | ................. | A01D 34/84 30/275.4 |
| 6,691,792 B2 * | 2/2004 | Keane | ................... | A01D 34/84 172/14 |
| 6,895,735 B2 * | 5/2005 | Gallentine | ........... | A01D 34/001 56/12.7 |
| 7,360,350 B1 * | 4/2008 | Smith, Jr. | ............ | A01D 34/001 56/12.7 |
| 7,617,661 B2 * | 11/2009 | Faeldan | ................ | A01D 34/82 56/12.7 |
| D623,670 S * | 9/2010 | Escobar | ........................ | D15/28 |
| 7,823,370 B1 * | 11/2010 | Wiebe | .................... | A01D 34/90 56/12.7 |
| 9,131,639 B1 * | 9/2015 | Groves | ................ | A01D 34/902 |
| 9,522,408 B2 * | 12/2016 | Hogan | .................... | B05B 12/34 |
| 2003/0047329 A1 * | 3/2003 | Keane | .................... | A01D 34/84 172/14 |
| 2005/0098328 A1 * | 5/2005 | Popp | ..................... | A01D 34/90 172/17 |
| 2011/0174903 A1 * | 7/2011 | Hogan | ................... | B05B 15/62 239/754 |

\* cited by examiner

STRING TRIMMER ATTACHMENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to string trimmer attachments and more particularly pertains to a new string trimmer attachment for edging a lawn.

BRIEF SUMMARY OF THE INVENTION

An embodiment of the disclosure meets the needs presented above by generally comprising a weed trimmer has a pole, a gear head coupled to the pole and a trimming head rotatably coupled to the gear head. The gear head is angled between the pole and the trimming head. A rolling unit is removably coupled to the pole of the weed trimmer. The rolling unit is oriented to extend along a perpendicular axis with respect to a rotational axis of the trimming head. Additionally, the rolling unit horizontally orients the rotational axis of the trimming head when the rolling unit is positioned to roll along a support surface. In this way the trimming head is positioned to perform edging along a vertical edge.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
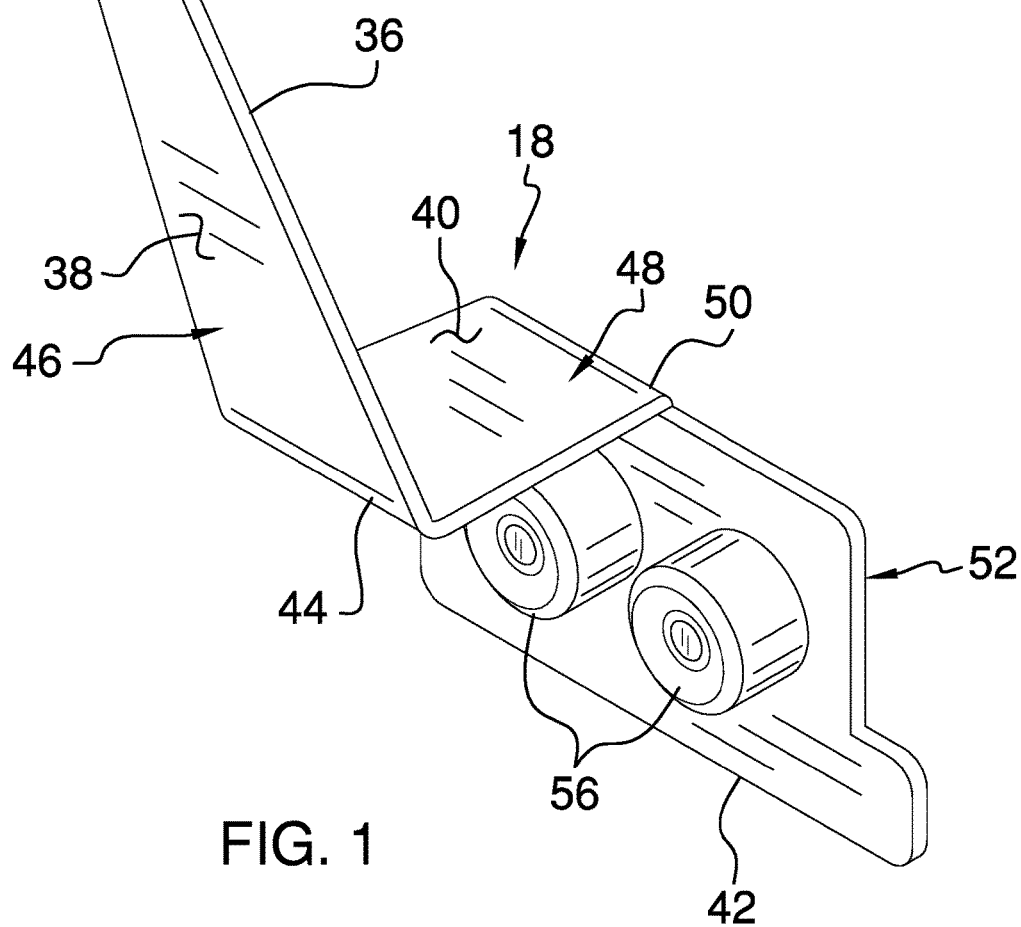
FIG. 1 is a perspective view of a rolling unit of an embodiment of the disclosure.
Figure 2:
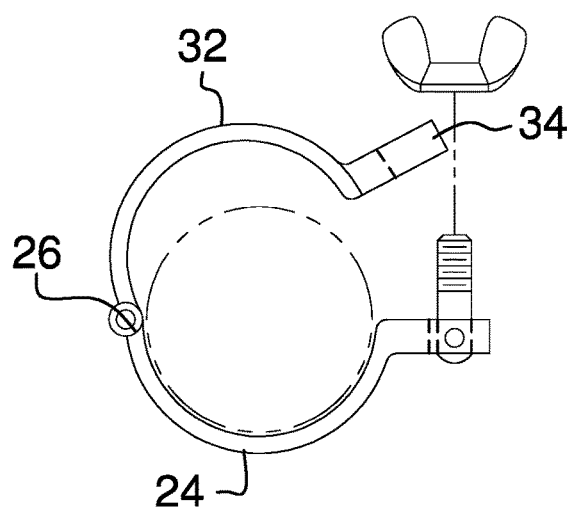
FIG. 2 is a front view of a clamp of an embodiment of the disclosure.
Figure 3:
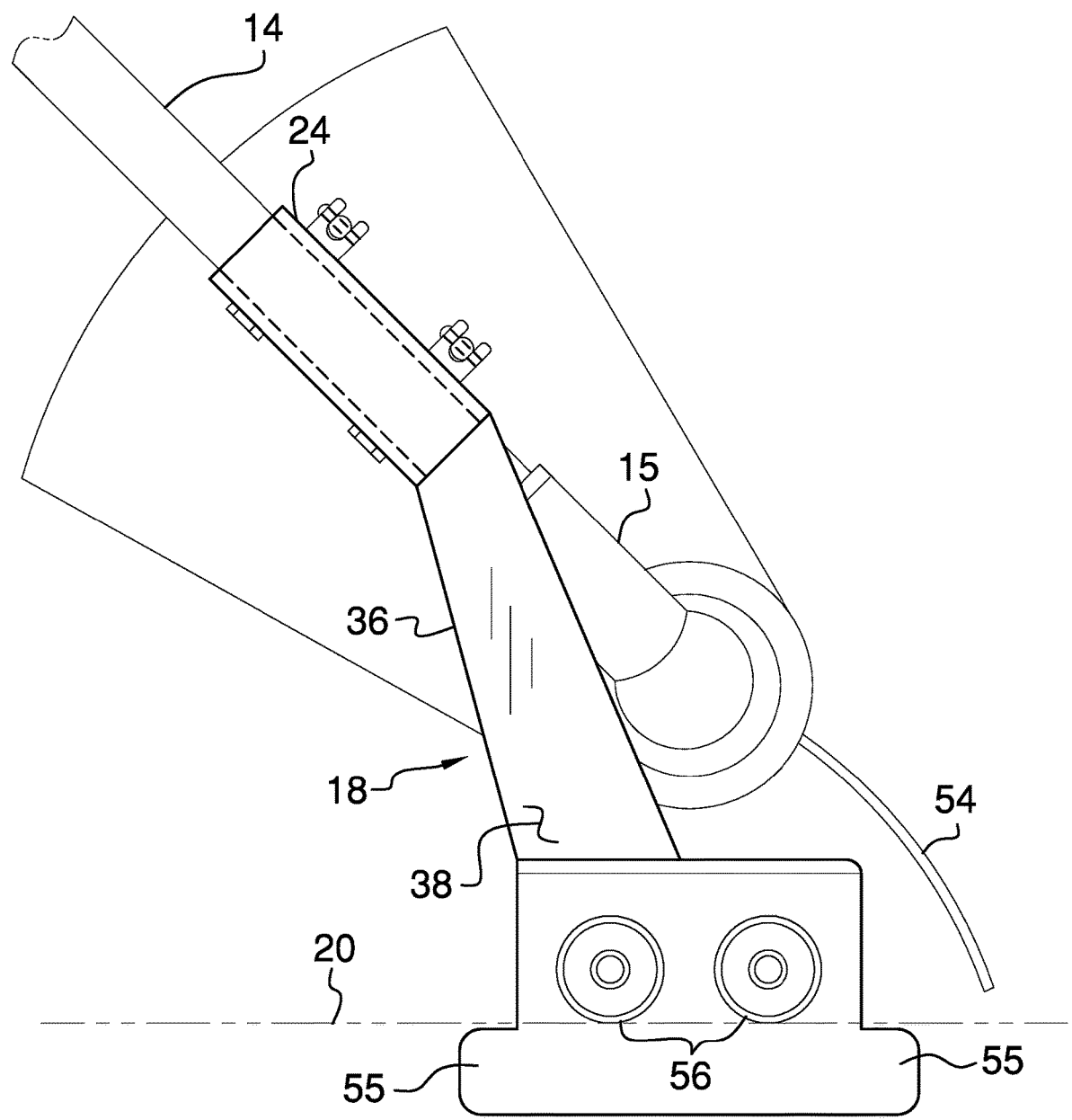
FIG. 3 is a right side view of an embodiment of the disclosure.
Figure 4:
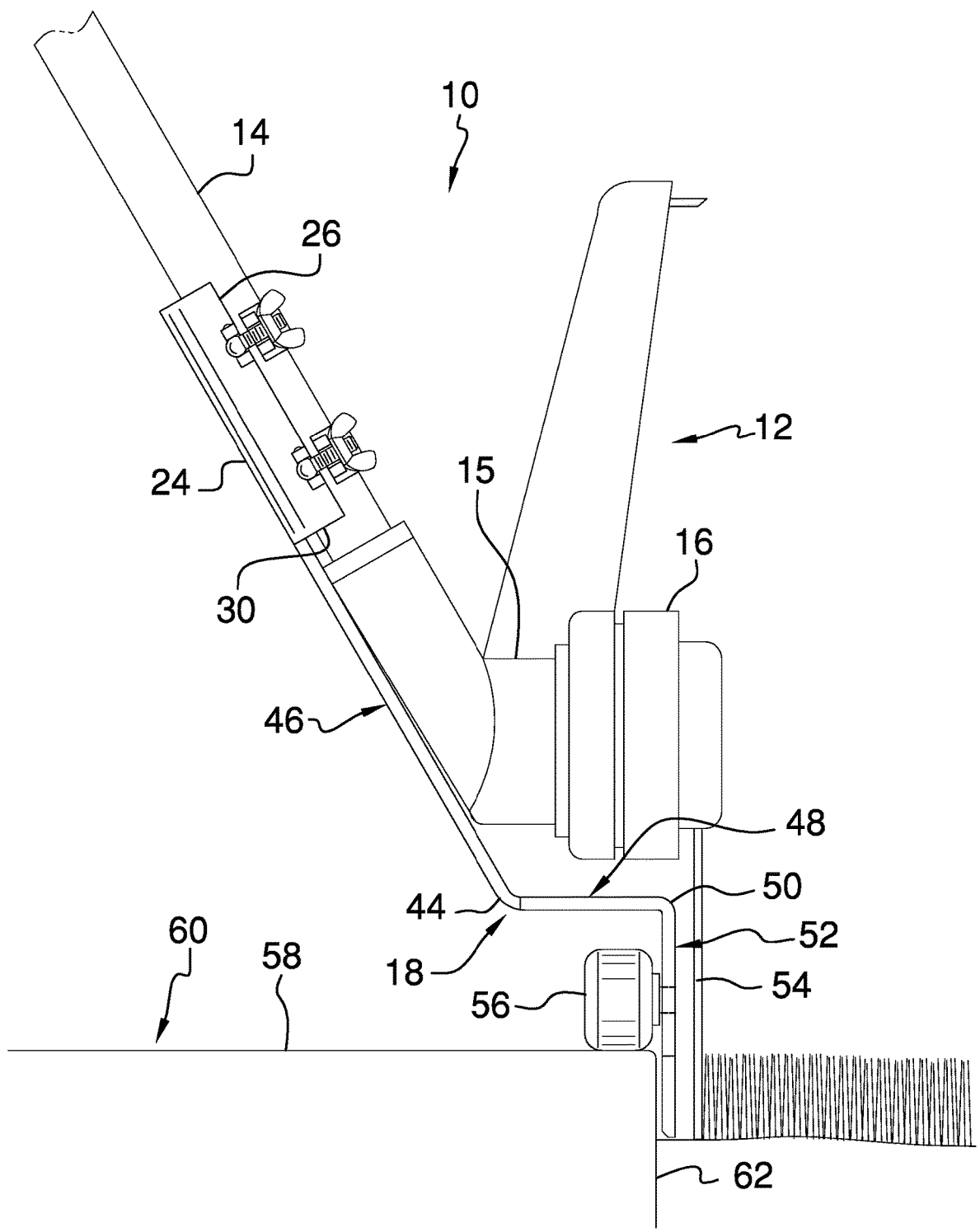
FIG. 4 is a perspective in-use view of an embodiment of the disclosure.
Figure 5:
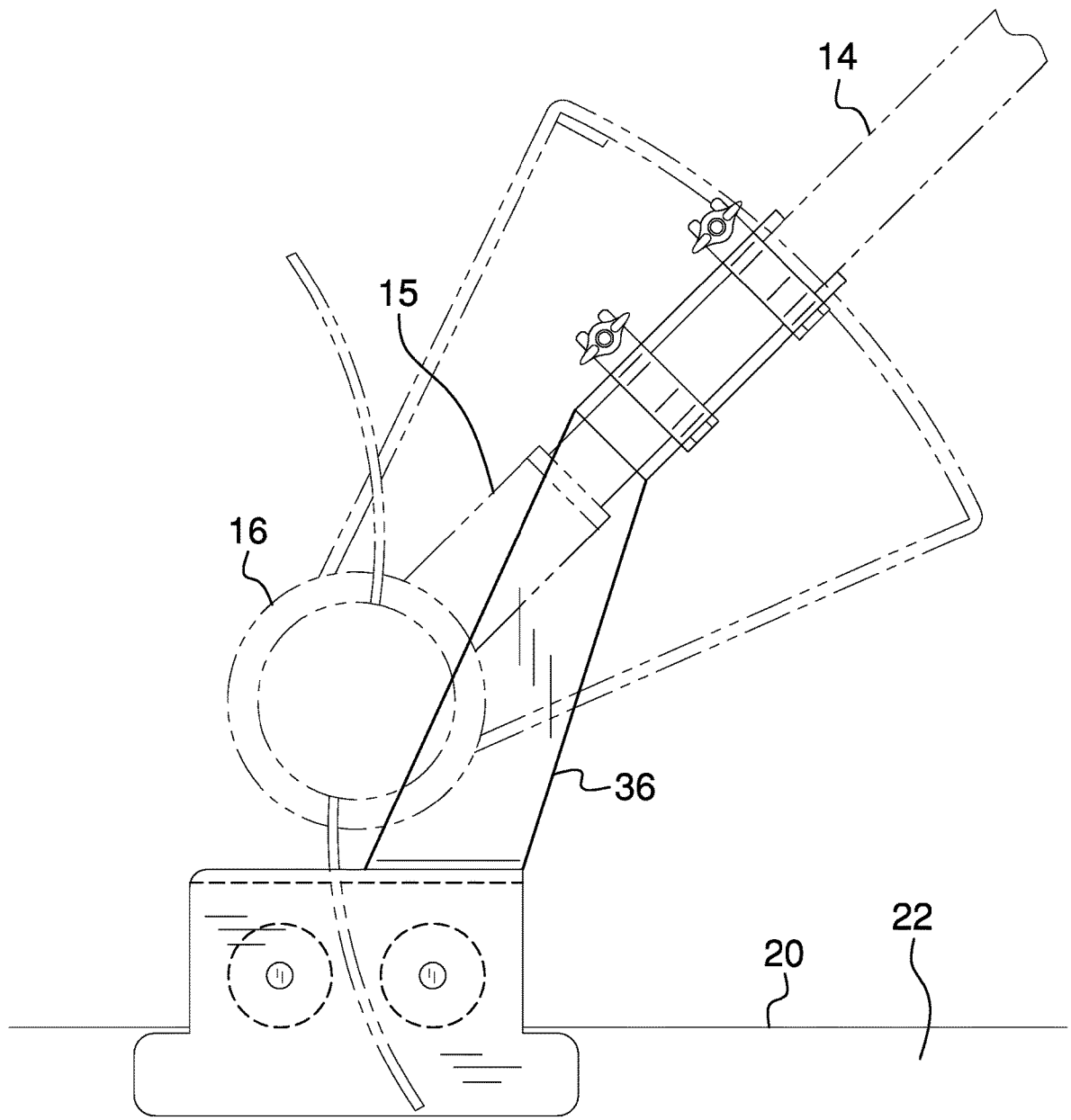
FIG. 5 is a left side phantom view of an embodiment of the disclosure.

With reference now to the drawings, and in particular to FIGS. 1 through 5 thereof, a new string trimmer attachment embodying the principles and concepts of an embodiment of the disclosure and generally designated by the reference numeral 10 will be described.

As best illustrated in FIGS. 1 through 5, the string trimmer attachment assembly 10 generally comprises a weed trimmer 12 that has a pole 14, a gear head 15 that is coupled to the pole 14 and a trimming head 16 that is rotatably coupled to the gear head 15. The gear head 15 is angled between the pole 14 and the trimming head 16. Additionally, the weed trimmer 12 may be a gas weed trimmer, an electric weed trimmer and any other conventional type of motorized weed trimmer.

A rolling unit 18 is provided and the rolling unit 18 is removably coupled to the pole 14 of the weed trimmer 12. The rolling unit 18 is oriented to extend along a perpendicular axis with respect to a rotational axis of the trimming head 16. Moreover, the rolling unit 18 horizontally orients the rotational axis of the trimming head 16 when the rolling unit 18 is positioned to roll along a support surface 20. In this way the trimming head 16 can perform edging along a vertical edge 22. Thus, edging can be performed along a sidewalk or the like with a conventional weed trimmer rather than having to employ a specialized edging machine.

The rolling unit 18 comprises a saddle 24 that has a first edge 26, a second edge 28 and a third edge 30 extending between the first 26 and second 28 edges. The saddle 24 is concavely arcuate between the first 26 and second 28 edges and the pole 14 of the weed trimmer 12 is positionable in the saddle 24 having the saddle 24 being spaced from the gear head 15. A pair of clamps 32 is each hingedly coupled to the first edge 26 of the saddle 24 and each of the clamps 32 has a distal end 34. Each of the clamps 32 is positionable in a closed position having the distal end 34 of each of the clamps 32 releasably engages the second edge 28 of the saddle 24 for retaining the saddle 24 around the pole 14. Moreover, each of the clamps 32 is positionable in an open position to disengage the second edge 28 of the saddle 24 for removing the pole 14 from the saddle 24. Each of the clamps 32 is concavely arcuate between the second edge 28 of the saddle 24 and the distal end 34 of the clamps 32. Thus, the saddle 24 and the clamps 32 conform to the curvature of the pole 14 when the clamps 32 are closed.

A plate 36 is attached to and extends downwardly away from the third edge 30 of the saddle 24 having the plate 36 being oriented at an angle with respect to a longitudinal axis of the saddle 24. The plate 36 has a first surface 38, a second surface 40 and a distal end 42 with respect to the saddle 24. The plate 36 has a first bend 44 therein to define a first section 46 that is positioned between the first bend 44 and the saddle 24. Additionally, the first bend 44 defines a second section 48 of the plate 36 extending away from the first bend 44. The second section 48 lies on a horizontal plane when the weed trimmer 12 is positioned for trimming weeds.

The plate 36 has a second bend 50 thereon that is positioned between the distal end 42 of the plate 36 and the first bend 44 to define a third section 52 of the plate 36 extending between the second bend 50 and the distal end 42. The third section 52 extends downwardly from the second section 48 and lies on a plane that is oriented perpendicular to the second section 48. The trimming head 16 is spaced above the second section 48 of the plate 36 when the pole 14 is positioned in the saddle 24. Additionally, a trimming line 54 on the trimming head 16 extends downwardly and is spaced from the second surface 40 of the third section 52 of the plate 36. The distal end 42 of the plate 36 includes a pair of tabs 55 that each extends laterally away from the plate 36 in opposite directions from each other.

A pair of rollers 56 is rotatably coupled to the first surface 38 of the third section 52 of the plate 36. Each of the rollers 56 has a rotational axis that is orientated perpendicular to the first surface 38 of the third section 52 of the plate 36. The rollers 56 are laterally spaced from each other and the rotational axes of the roller lie in a shared horizontally orientated plane. Each of the rollers 56 is positionable to roll along a top surface 58 of a sidewalk 60 having the first surface 38 of the third section 52 of the plate 36 abutting a vertical surface 62 of the sidewalk 60. The trimming head 16 is aligned with the vertical surface 62 of the sidewalk 60 and is spaced above the vertical surface 62 for performing edging along the vertical surface 62.

In use, the saddle 24 is positioned on the pole 14 and each of the clamps 32 is positioned in the closed position to retain the saddle 24 on the pole 14. The weed trimmer 12 is manipulated to position each of the rollers 56 on the top surface 58 of the sidewalk 60, or other surface along which edging is to be performed. In this way the trimming head 16 is oriented to rotate about a horizontal axis. Additionally, the third section 52 of the plate 36 is positioned to abut the vertical surface of the sidewalk 60. In this way the trimming line 54 is positioned adjacent to the vertical surface 62 of the sidewalk 60 thereby facilitating the trimming line 54 to perform edging along the sidewalk 60 when the weed trimmer 12 is turned on. Thus, edging can be performed with an existing weed trimmer 12 rather than a specialty edging machine.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An edging attachment assembly comprising:
    a weed trimmer having a pole, a gear head being coupled to said pole and a trimming head being rotatably coupled to said gear head, said gear head being angled between said pole and said trimming head;
    a rolling unit being removably coupled to said pole of said weed trimmer, said rolling unit being oriented to extend along a perpendicular axis with respect to a rotational axis of said trimming head, said rolling unit horizontally orienting said rotational axis of said trimming head when said rolling unit is positioned to roll along a support surface wherein said trimming head is configured to perform edging along a vertical edge, said rolling unit comprising
    a saddle having a first edge, a second edge and a third edge extending between said first edge and said second edge, said saddle being concavely arcuate between said first and second edges, said saddle having said pole of said weed trimmer being positioned therein having said saddle being spaced from said gear head,
    a plate being attached to and extending downwardly away from said third edge of said saddle, said plate having a distal end with respect to said saddle, and
    a pair of rollers being rotatably coupled to said plate, said pair of rollers being spaced above said distal end of said plate wherein said distal end of said plate is configured to extend below the support surface when said pair of rollers is positioned on the support surface, each of said rollers having a rounded peripheral edge facing said plate, each of said rollers having an interior surface facing said plate, each of said rollers being spaced from said plate such that said interior surface is configured to be vertically aligned with the vertical edge when the plate is positioned to extend adjacent to the vertical edge;
    said plate having a first surface and a second surface;
    said plate having a first bend therein to define a first section positioned between said first bend and said saddle, said first bend defining a second section of said plate extending away from said first bend, said second section lying on a horizontal plane when said weed trimmer is positioned for trimming weeds;
    said plate having a second bend thereon being positioned between said distal end and said first bend to define a third section being extending between said second bend and said distal end, said third section extending downwardly from said second section and lying on a plane being oriented perpendicular to said second section; and
    said trimming head being spaced above said second section of said plate when said pole is positioned in said saddle and having a trimming line on said trimming head extending downwardly along and being spaced from said second surface of said third section of said plate.

2. The edging attachment assembly according to claim 1, further comprising a pair of clamps, each of said clamps being hingedly coupled to said first edge of said saddle, each of said clamps having a distal end, said distal end of each of said clamps releasably engaging said second edge of said saddle for retaining said saddle around said pole, each of said clamps disengaging said second edge of said saddle for removing said pole from said saddle.

3. The edging attachment assembly according to claim 1, further comprising said pair of rollers being rotatably coupled to said first surface of said third section of said plate, each of said rollers having a rotational axis being orientated perpendicular to said first surface of said third section of said plate, said rollers being laterally spaced from each other, said rotational axes of said roller lying in a shared horizontally orientated plane.

4. The edging attachment assembly according to claim 3, wherein each of said rollers is positionable to roll along a top surface of a sidewalk having said first surface of said third section of said plate abutting a vertical surface of said sidewalk, said trimming head being aligned with the vertical surface of said sidewalk and being spaced above the vertical surface wherein said trimming head is configured to perform edging along the vertical surface.

5. An edging attachment assembly comprising:
a weed trimmer having a pole, a gear head being coupled to said pole and a trimming head being rotatably coupled to said gear head, said gear head being angled between said pole and said trimming head; and
a rolling unit being removably coupled to said pole of said weed trimmer, said rolling unit being oriented to extend along a perpendicular axis with respect to a rotational axis of said trimming head, said rolling unit horizontally orienting said rotational axis of said trimming head when said rolling unit is positioned to roll along a support surface wherein said trimming head is configured to perform edging along a vertical edge, said rolling unit comprising:
a saddle having a first edge, a second edge and a third edge extending between said first edge and said second edge, said saddle being concavely arcuate between said first and second edges, said saddle having said pole of said weed trimmer being positioned therein having said saddle being spaced from said gear head;
a pair of clamps, each of said clamps being hingedly coupled to said first edge of said saddle, each of said clamps having a distal end, said distal end of each of said clamps releasably engaging said second edge of said saddle for retaining said saddle around said pole, each of said clamps disengaging said second edge of said saddle for removing said pole from said saddle;
a plate being attached to and extending downwardly away from said third edge of said saddle, said plate having a first surface, a second surface, and a distal end with respect to said saddle, said plate having a first bend therein to define a first section positioned between said first bend and said saddle, said first bend defining a second section of said plate extending away from said first bend, said second section lying on a horizontal plane when said weed trimmer is positioned for trimming weeds, said plate having a second bend thereon being positioned between said distal end and said first bend to define a third section being extending between said second bend and said distal end, said third section extending downwardly from said second section and lying on a plane being oriented perpendicular to said second section, said trimming head being spaced above said second section of said plate when said pole is positioned in said saddle and having a trimming line on said trimming head extending downwardly along and being spaced from said second surface of said third section of said plate; and
a pair of rollers being rotatably coupled to said first surface of said third section of said plate, each of said rollers having a rotational axis being orientated perpendicular to said first surface of said third section of said plate, said rollers being laterally spaced from each other, said rotational axes of said roller lying in a shared horizontally orientated plane, said pair of rollers being spaced above said distal end of said plate wherein said distal end of said plate is configured to extend below the support surface when said pair of rollers is positioned on the support surface whereby each of said rollers is positionable to roll along a top surface of a sidewalk having said first surface of said third section of said plate abutting a vertical surface of said sidewalk, said trimming head being aligned with the vertical surface of said sidewalk and being spaced above the vertical surface wherein said trimming head is configured to perform edging along the vertical surface, each of said rollers having a rounded peripheral edge facing said plate, each of said rollers having an interior surface facing said plate, each of said rollers being spaced from said plate such that said interior surface is configured to be vertically aligned with the vertical edge when the plate is positioned to extend adjacent to the vertical edge.

* * * * *